(12) United States Patent
Ku et al.

(10) Patent No.: US 9,876,826 B2
(45) Date of Patent: Jan. 23, 2018

(54) METHODS AND TARGET ARCHITECTURE FOR ENABLING IP CARRIER PEERING

(71) Applicant: AT&T INTELLECTUAL PROPERTY I, L.P., Atlanta, GA (US)

(72) Inventors: Bernard S. Ku, Austin, TX (US); James W. Forsyth, Royal Oak, MI (US); Lakshminarashimhan Naidu, Pearland, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 82 days.

(21) Appl. No.: 14/928,256

(22) Filed: Oct. 30, 2015

(65) Prior Publication Data
US 2017/0126750 A1 May 4, 2017

(51) Int. Cl.
| | |
|---|---|
| *H04L 12/66* | (2006.01) |
| *H04L 29/06* | (2006.01) |
| *H04L 12/741* | (2013.01) |
| *G06F 17/30* | (2006.01) |
| *H04L 29/12* | (2006.01) |
| *H04M 7/00* | (2006.01) |

(52) U.S. Cl.
CPC .... *H04L 65/1069* (2013.01); *G06F 17/30914* (2013.01); *G06F 17/30979* (2013.01); *H04L 45/74* (2013.01); *H04L 61/157* (2013.01); *H04L 61/1511* (2013.01); *H04L 65/104* (2013.01); *H04L 65/1016* (2013.01); *H04M 7/006* (2013.01)

(58) Field of Classification Search
CPC . H04L 65/1069; H04L 45/74; H04L 61/2007; H04L 65/1016; H04L 65/104; H04L 61/1511; H04L 61/157; G06F 17/30914; G06F 17/30979; H04F 17/30914; H04F 17/30979
USPC .......................................... 370/352
See application file for complete search history.

(56) References Cited

U.S. PATENT DOCUMENTS

| | | | | |
|---|---|---|---|---|
| 2003/0081754 | A1* | 5/2003 | Esparza | ............ H04L 29/12066 |
| | | | | 379/221.01 |
| 2007/0061397 | A1* | 3/2007 | Gregorat | ............. H04L 29/1216 |
| | | | | 709/203 |
| 2007/0071221 | A1* | 3/2007 | Allen | .................. H04L 29/1216 |
| | | | | 379/265.01 |

(Continued)

*Primary Examiner* — Sai-Ming Chan
(74) *Attorney, Agent, or Firm* — Akerman LLP; Michael K. Dixon; Mammen (Roy) P. Zachariah, Jr.

(57) ABSTRACT

A system for providing an architecture for enabling internet protocol (IP) carrier peering is disclosed. The system provides mechanisms for providing carrier telephone number mapping (ENUM)-based routing for subscribers of a first carrier to locate and connect with subscribers of another IP peering carrier. The system may receive an IP call from a first device of a first carrier that is destined for a second device of a second carrier. The call is forwarded to a breakout gateway control function/transit function that initiates a modified ENUM query to an internetwork packet exchange partner (IPX-P) network using an intercarrier ENUM apex domain. To retrieve a record for routing the call, the modified ENUM query is sent to an IPX-P ENUM via a domain name service name server record configuration directing to the IP address of the IPX-P ENUM. Based on the record, the call is then routed to the second device.

20 Claims, 7 Drawing Sheets

(56) References Cited

U.S. PATENT DOCUMENTS

2009/0225744 A1* 9/2009 Zerillo ................ H04L 29/1216
370/352
2012/0300768 A1* 11/2012 Huang .................. H04L 61/157
370/352

* cited by examiner

METHODS AND TARGET ARCHITECTURE FOR ENABLING IP CARRIER PEERING

FIELD OF THE INVENTION

The present application relates to content distribution network technologies, peer-to-peer technologies, and carrier peer connection technologies, and more particularly, to a system and method for providing a target architecture for enabling internet protocol (IP) carrier peering.

BACKGROUND

In today's society, users are increasingly utilizing network and other service providers to gain access to the Internet, place internet-based calls, access software services, request and receive various types of content, access software applications, and perform a variety of other tasks and functions. In order to handle large volumes of requests from users requesting various types of content, services, and applications, businesses often employ the use of content delivery networks and other networks to serve the content, connect the calls, and provide the services to the users in a more efficient and effective manner. Such networks are particularly useful when high performance, reliability, scalability, and cost savings associated with distributing the content, connecting the calls, and providing the services are important.

While current network technologies provide substantial benefits to users and businesses, there is still significant room to enhance current methodologies and technologies for performing IP to IP peering. For example, telecommunications carriers and their accompanying networks typically operate strictly in their own network islands. By doing so, there is often no interoperability between carriers to allow subscribers from one carrier to partake in IP to IP services with subscribers from another carrier. As a result, current network technologies may be modified so as to provide enhanced quality-of-service for users and businesses. Such enhancements and improvements to network technologies may provide for improved customer satisfaction, increased revenue for carriers, and increase functionality for both users and businesses.

SUMMARY

A system and accompanying methods for providing a target architecture for enabling IP carrier peering are disclosed. In particular, the system and methods may provide mechanisms for providing carrier telephone number mapping (ENUM)-based routing for subscribers of a first carrier to locate and connect with subscribers of another IP peering carrier. In order to accomplish the foregoing, the system and methods may include receiving an outbound IP call from a first user device of a first carrier. The outbound IP call may be destined for a second user device associated with a second carrier. When the first carrier queries a private ENUM of the first carrier using a domain (e.g. "e164.arpa") of the first carrier to obtain a record corresponding to the second user device associated with the second carrier, the private ENUM of the first carrier may not return a matching record. The call may then be forwarded to a breakout gateway control function/transit function (BGCF/TF) associated with the first carrier. The BGCF/TF may then initiate a modified ENUM query to an internetwork packet exchange partner (IPX-P) network using an intercarrier ENUM apex domain, such as, but not limited to, "e164enum.net". In particular, the modified ENUM query may be sent to an IPX Tier 1 ENUM of the IPX-P network via a domain name service (DNS) name server record configuration directing to the IP address of the IPX Tier 1 ENUM.

Once the IPX Tier 1 ENUM of the IPX-P network receives the modified ENUM query including the intercarrier ENUM apex domain, the IPX Tier 1 ENUM may return a pointer to a Tier 2 ENUM of the second carrier, such as via a name server record of the Tier 2 ENUM that may be hosted by the IPX-P network. The BGCF/TF may proceed to query the Tier 2 ENUM of the second carrier based on the pointer, and the Tier 2 ENUM of the second carrier may find an entry corresponding to the called number associated with the second user device of the second carrier. The Tier 2 ENUM of the second carrier may return a name authority pointer (NAPTR) record associated with entry, along with a gateway uniform resource identifier (URI) identifying where (e.g. a device) the second carrier is willing to accept calls from the first carrier, to the BGCF/TF. The BGCF/TF may proceed to forward call processing of the outbound IP call from the first carrier to the second carrier based on the NAPTR record and gateway URI. As a result, the second carrier may then complete the outbound IP call to the desired second user device of the second carrier. Notably, the systems and methods do not require the need for intervention of the first carrier's private ENUM to forward to the IPX Tier 1 ENUM so that overall call flow can be optimized. This may result in dramatically improved and timely call termination. Furthermore, the systems and methods may enable carriers to peer with other carriers to expand their service area coverage so as to provide rich IP services.

In one embodiment, a system for providing a target architecture for enabling IP carrier peering is disclosed. The system may include a memory that stores instructions and a processor that executes the instructions to perform various operations of the system. The system may perform an operation that includes receiving, from a first device of a first carrier, a request to connect an internet protocol call to a second device. The system may then perform an operation that includes querying, using a first query, an ENUM of the first carrier for a record including a called number corresponding to the second device. When the first query does not return the record including the called number, the system may perform an operation that includes converting a domain of the first query to include an intercarrier ENUM apex domain so as to create a second query. The system may proceed to perform an operation that includes querying, using the second query, an internetwork packet exchange ENUM of a partner network of the first carrier and a second carrier. After receiving a pointer to an ENUM of the second carrier based on the second query, the system may perform an operation that includes querying the second telephone number mapping of the second carrier for the record. The system may then perform an operation that includes receiving the record from the second telephone number mapping of the second carrier. Finally, the system may perform an operation that includes routing, based on the record, the internet protocol call to the second carrier so as to connect the internet protocol call to the second device.

In another embodiment, a method for providing a target architecture for enabling IP carrier peering is disclosed. The method may include utilizing a memory that stores instructions, and a processor that executes the instructions to perform the various functions of the method. In particular, the method may include receiving, from a first device of a first carrier, a request to connect an internet protocol call to a second device. Additionally, the method may include querying, using a first query, a first telephone number mapping of the first carrier for a record including a called number corresponding to the second device. When the first query does not return the record including the called number, the method may include modifying a domain of the first query to include an intercarrier telephone number mapping apex domain so as to create a second query. The method may include querying, using the second query, an internetwork packet exchange telephone number mapping of a partner network of the first carrier and a second carrier. After receiving a pointer to a second telephone number mapping of the second carrier based on the second query, the method may include querying the second telephone number mapping of the second carrier for the record. The method may then include obtaining the record from the second telephone number mapping of the second carrier. Finally, the method may include routing, based on the record, the internet protocol call to the second carrier so as to connect the internet protocol call to the second device.

According to yet another embodiment, a computer-readable device having instructions for providing a target architecture for enabling IP carrier peering is provided. The computer instructions, which when loaded and executed by a processor, may cause the processor to perform operations including: receiving, from a first device of a first carrier, a request to connect an internet protocol call to a second device; querying, using a first query, a first telephone number mapping of the first carrier for a record including a called number corresponding to the second device; modifying, when the first query does not return the record including the called number, a domain of the first query to include an intercarrier telephone number mapping apex domain so as to create a second query, wherein the domain is modified by utilizing instructions from a memory that are executed by a processor; querying, using the second query, an internetwork packet exchange telephone number mapping of a partner network of the first carrier and a second carrier; querying, after receiving a pointer to a second telephone number mapping of the second carrier based on the second query, the second telephone number mapping of the second carrier for the record; receiving the record from the second telephone number mapping of the second carrier; and forwarding, based on the record, the internet protocol call to the second carrier so as to connect the internet protocol call to the second device.

These and other features of the systems and methods for providing a target architecture for enabling IP carrier peering are described in the following detailed description, drawings, and appended claims.

DETAILED DESCRIPTION OF THE INVENTION

A system 100 and accompanying methods for providing a target architecture for enabling IP carrier peering are disclosed. In particular, the system 100 and methods may provide mechanisms for providing carrier ENUM-based routing for subscribers of a first carrier to locate and connect with subscribers of another IP peering carrier. In order to accomplish the foregoing, the system 100 and methods may include receiving an outbound IP call from a first user device 102 of a first carrier communications network 125. The outbound IP call may be destined for a second user device 111 associated with a second carrier communications network 175. When the first carrier queries a private ENUM 133 of the first carrier using a domain (e.g. "e164.arpa") of the first carrier to obtain a record corresponding to the called number of the second user device 111 associated with the second carrier, the private ENUM 133 of the first carrier may not return a matching record. The call may then be forwarded to a BGCF/TF associated with the first carrier communications network 125. The BGCF/TF may then initiate a modified ENUM query to an IPX-P network 165 using an intercarrier ENUM apex domain, such as, but not limited to, "e164enum.net". In particular, the modified ENUM query may be sent to an IPX Tier 1 ENUM 167 of the IPX-P network 165 via a domain name service (DNS) name server record configuration directing to the IP address of the IPX Tier 1 ENUM 167.

Once the IPX Tier 1 ENUM 167 of the IPX-P network 165 receives the modified ENUM query including the intercarrier ENUM apex domain, the IPX Tier 1 ENUM 167 may return a pointer to a Tier 2 ENUM 177 of the second carrier, such as via a name server record of the Tier 2 ENUM 177 that may be hosted by the IPX-P network 165. The BGCF/TF may proceed to query the Tier 2 ENUM 177 of the second carrier based on the pointer, and the Tier 2 ENUM 177 of the second carrier may find an entry corresponding to the called number associated with the second user device 111 of the second carrier. The Tier 2 ENUM 177 of the second carrier may return a name authority pointer (NAPTR) record associated with entry, along with a gateway uniform resource identifier (URI) identifying where (e.g. Session Border Controller (SBC) device 179) the second carrier is willing to accept calls from the first carrier, to the BGCF/TF. The BGCF/TF may proceed to forward call processing of the outbound IP call from the first carrier to the second carrier based on the NAPTR record and gateway URI. As a result, the second carrier may then complete the outbound IP call to the desired second user device 111 of the second carrier. Notably, the system 100 and methods do not require the need for intervention of the first carrier's private ENUM 133 to forward to the IPX Tier 1 ENUM 167 so that overall call flow can be optimized. The functionality provided by the system 100 and accompanying methods may result in dramatically improved and timely call termination.

Figure 1:
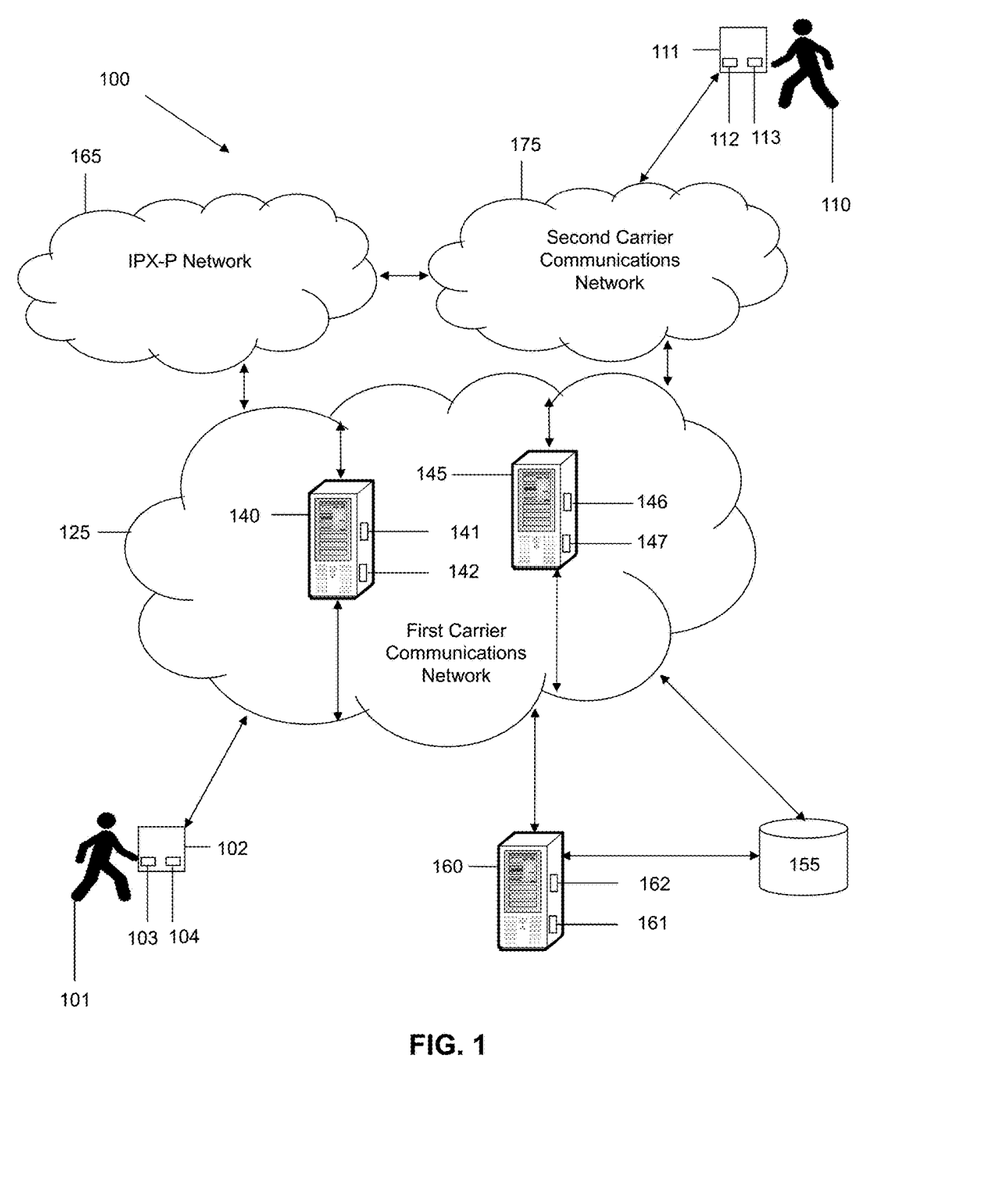
FIG. 1 is a schematic diagram of a system for providing a target architecture for enabling IP carrier peering according to an embodiment of the present disclosure.
Figure 2:
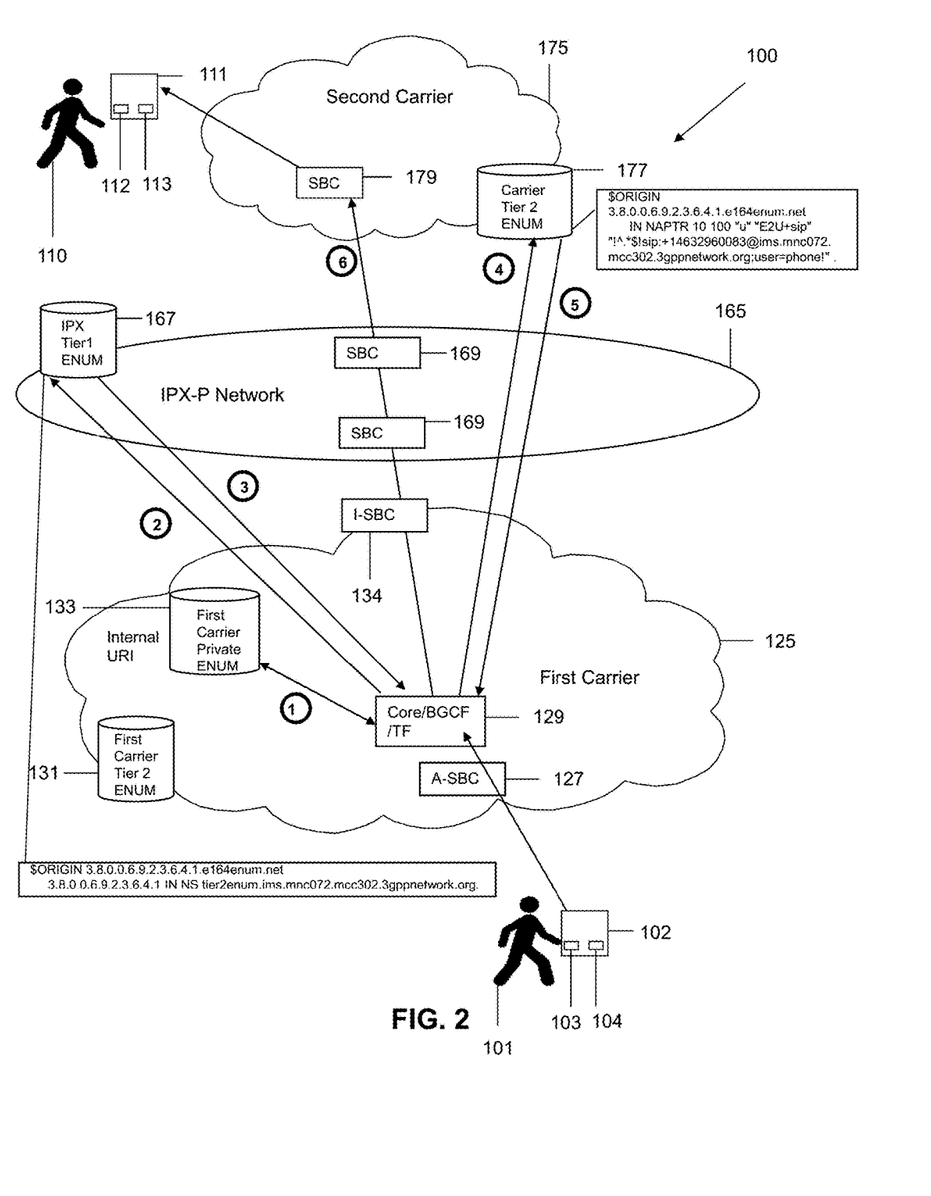
FIG. 2 is a schematic diagram providing a detailed view of the system for providing the target architecture for enabling IP carrier peering provided in FIG. 1.
Figure 3:
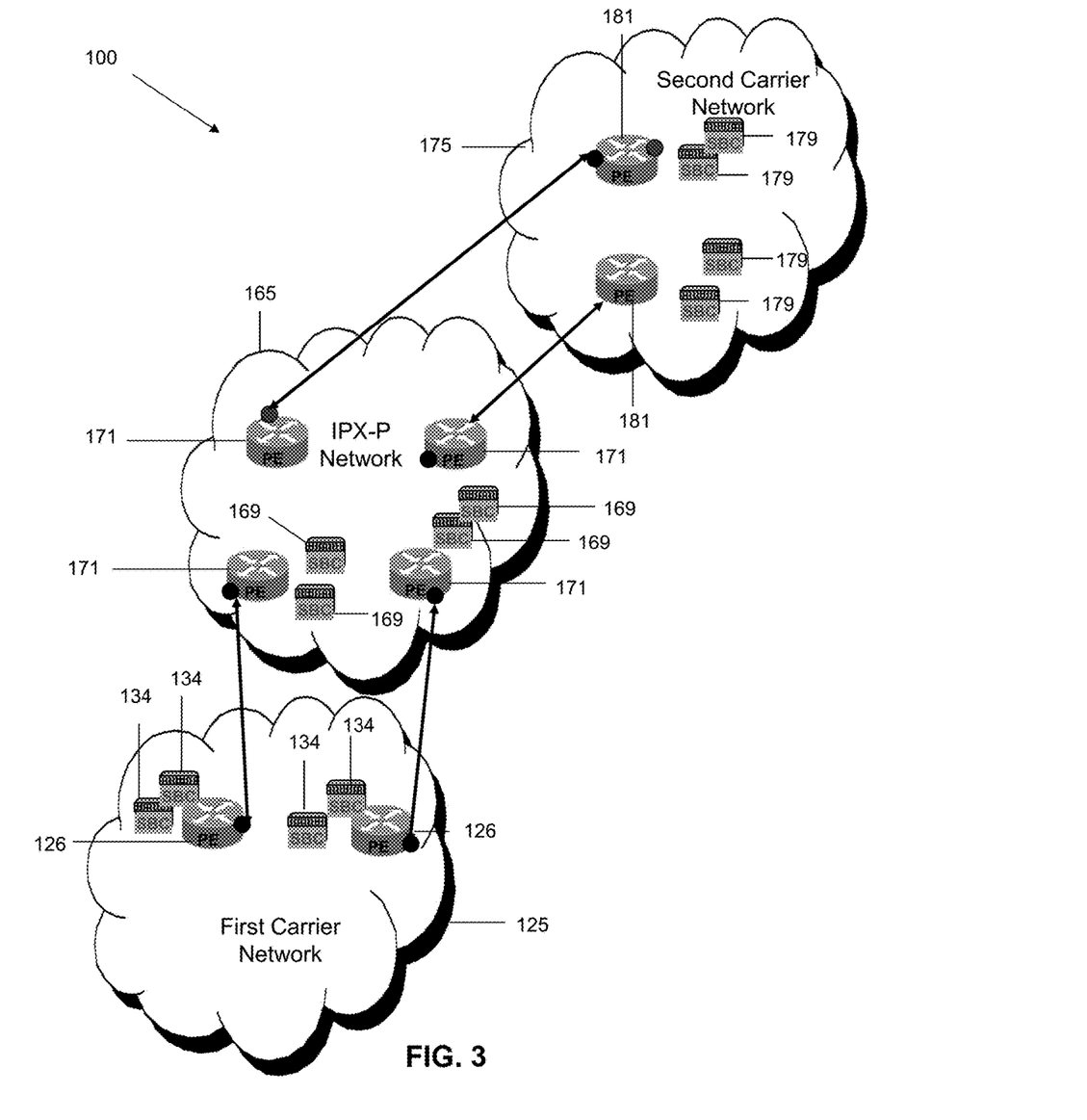
FIG. 3 is a schematic diagram illustrating IPX interconnection between a first carrier network, an IPX-P network, and a second carrier network.

As shown in FIGS. 1-3, a system 100 for providing a target architecture for enabling IP carrier peering is disclosed. The system 100 may be configured to support, but is not limited to supporting, content delivery services, cloud computing services, IP Multimedia Subsystem (IMS) services, satellite services, telephone services, voice-over-internet protocol services (VoIP), voice-over-long-term-evolution (VoLTE) services, software as a service (SaaS) applications, gaming applications and services, productivity applications and services, mobile applications and services, and any other computing applications and services. The system may include a first user 101, who may utilize a first user device 102 to access data, content, and services, or to perform a variety of other tasks and functions. As an example, the first user 101 may utilize first user device 102 to transmit signals to access various online services and content, such as those provided by a content provider or service provider associated with first carrier communications network 125. As another example, the first user 101 may utilize first user device 102 to make one or more IP-based calls (or other types of calls) to subscribers of the first carrier, subscribers of a second carrier, or to subscribers of any other carrier. The first user 101 may be a subscriber of a first carrier that may operate and control first carrier communications network 125. The first user device 102 may include a memory 103 that includes instructions, and a processor 104 that executes the instructions from the memory 103 to perform the various operations that are performed by the first user device 102. In certain embodiments, the processor 104 may be hardware, software, or a combination thereof. In certain embodiments, the first user device 102 may be a computer, a laptop, a tablet device, a phablet, a server, a mobile device, a smartphone, a smart watch, or any other type of computing device. Illustratively, the first user device 102 is shown as a smartphone device in FIGS. 1-2.

In addition to the first user 101, the system 100 may also include a second user 110, who may utilize a second user device 111 to also access data, content, and services, and to perform a variety of other functions. For example, the second user device 111 may be utilized by the second user 110 to transmit signals to request various types of content, services, and data provided by content and service providers associated with the second carrier communications network 175 or any other network in the system 100. Also, the second user 110 may utilize second user device 111 to make one or more IP-based calls (or other types of calls) to subscribers of the second carrier, subscribers of the first carrier, or subscribers of any other carrier. The second user 110 may be a subscriber of the second carrier that may control and operate second carrier communications network 175. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. Similar to the first user device 102, in certain embodiments, the second user device 111 may be a computer, a laptop, a tablet device, a phablet, a server, a mobile device, a smartphone, a smart watch, or any other type of computing device. Illustratively, the second user device 111 is shown as a smartphone device in FIGS. 1-2.

In certain embodiments, first user device 102 and second user device 111 may have any number of software applications and/or application services stored and/or accessible thereon. For example, the first and second user devices 102, 111 may include cloud-based applications, VoIP applications, other types of phone-based applications, media streaming applications, content-based applications, media-editing applications, database applications, gaming applications, internet-based applications, browser applications, mobile applications, service-based applications, productivity applications, video applications, music applications, social media applications, any other type of applications, any types of application services, or a combination thereof. In certain embodiments, the software applications and services may include one or more graphical user interfaces so as to enable the first and second users 101, 110 to readily interact with the software applications. The software applications and services may also be utilized by the first and second users 101, 110 to interact with the any device in the system 100, any network in the system 100, or any combination thereof. In certain embodiments, the first user device 102 and the second user device 111 may include associated telephone numbers, device identities, or any other identifiers to uniquely identify the first and second user devices 102, 111.

The system 100 may also include a first carrier communications network 125. The first carrier communications network 125 of the system 100 may be configured to link each of the devices in the system 100 to one another. For example, the first carrier communications network 125 may be utilized by the first user device 102 to connect with other devices within or outside first carrier communications network 125. Additionally, the first carrier communications network 125 may be configured to transmit, generate, and receive any information and data traversing the system 100. In certain embodiments, the first carrier communications network 125 may include any number of servers, databases, or other componentry. The first carrier communications network 125 may also include and be connected to a cloud-computing network, an IMS network, a VoIP network, a VoLTE network, a wireless network, an Ethernet network, a satellite network, a broadband network, a cellular network, a private network, a cable network, the Internet, an internet protocol network, a multiprotocol label switching (MPLS) network, a content distribution network, any network, or any combination thereof. Illustratively, servers 140 and 145 are shown as being included within first carrier communications network 125, and the first carrier communications network 125 is shown as a network including IMS capabilities. In certain embodiments, the first carrier communications network 125 may be part of a single autonomous system that is located in a particular geographic region, or be part of multiple autonomous systems that span several geographic regions.

The first carrier communications network 125 may include a series of components to facilitate communications and the functions of the first carrier communications network 125. In particular, the first carrier communications network 125 may include an A-SBC 127, which may include any of the functions of a traditional access session border controller. For example, A-SBC 127 may reside at a border of the first carrier communications network 125 and may be the device where the first user device 102 may access the IMS Core 129 of the first carrier communications network 125, such as when making an IP-based call. The IMS Core 129 of the first carrier communications network 125 may perform any functions of a traditional IMS Core and may include a BGCF/TF. The first carrier communications network 125 may also include a private ENUM 133 that may conform to the E.164 ENUM standard. The private ENUM 133 may also include any of the functions and features of a traditional private ENUM and may be private to the first carrier communications network 125. The first carrier communications network 125 may further include a Tier 2 ENUM 131 that may include any of the functionality of a traditional Tier 2 ENUM. The private ENUM 133 and Tier 2 ENUM 131 may contain DNS records and may utilize the DNS records to translate telephone numbers into a URI or IP address that may be utilized in IP-based communications. Moreover, the first carrier communications network 125 may include an Interconnect-SBC (I-SBC) 134 that may include any of the functions and features of a traditional I-SBC. For example, the I-SBC 134 may reside at a boundary of the first carrier communications network 125 where different networks (e.g. IXP-P network 165 and/or second carrier communications network 175) may interconnect or peer with the first carrier communications network 125. Moreover, the first carrier communications network 125 may include any number of provider edge devices 126 (e.g. routers) that may be utilized to connect the first carrier communications network 125 to the other networks in the system 100.

The system 100 may further include an IPX-P network 165. The IPX-P network 165 of the system 100 may be configured to link each of the devices and/or networks in the system 100 to one another, and may include any of the functionality of an internetwork packet exchange network. The IPX-P network 165 may be a partner network of the first carrier communications network 125 and/or a partner network of the second carrier communications network 125. Additionally, the IPX-P network 165 may be configured to transmit, generate, and receive any information and data traversing the system 100. In certain embodiments, the IPX-P network 165 may include any number of servers, databases, or other componentry. The IPX-P network 165 may also include and be connected to a cloud-computing network, an IMS network, a VoIP network, a VoLTE network, a wireless network, an Ethernet network, a satellite network, a broadband network, a cellular network, a private network, a cable network, the Internet, an internet protocol network, a MPLS network, a content distribution network, any network or any combination thereof. In certain embodiments, the IPX-P network 165 may be part of a single autonomous system that is located in a particular geographic region, or be part of multiple autonomous systems that span several geographic regions.

The IPX-P network 165 may include a series of SBCs 169 that may be utilized to exert control over signaling associated with communications, such as calls, traversing through the IPX-P network 165, and may include any functionality associated with a session border controller. The IPX-P network 165 may further include an IPX Tier 1 ENUM 167 that may include any of the functionality of a traditional Tier 1 ENUM and may be a higher tiered ENUM as compared to other ENUMs in the system 100. The IPX Tier 1 ENUM 167 may store name server records including information and IP addresses for Tier 2 ENUMs 131, 177 of networks that are partnered with the IPX-P network 165. For example, the IPX Tier 1 ENUM may include IP address information and pointers to the Tier 2 ENUM 131 of the first carrier and the Tier 2 ENUM 177 of the second carrier. In certain embodiments, the IPX Tier 1 ENUM 167 may store name server records and pointers for other types of ENUMs and/or for any type of devices in other partner networks. Moreover, the IPX-P network 165 may include any number of provider edge devices 171 (e.g. routers) that may be utilized to connect the IPX-P network 165 to the other networks in the system 100.

The system 100 may also include a second carrier communications network 175. The second carrier communications network 175 of the system 100 may be configured to link each of the devices in the system 100 to one another. For example, the second carrier communications network 175 may be utilized by the second user device 111 to connect with other devices within or outside second carrier communications network 175. Additionally, the second carrier communications network 175 may be configured to transmit, generate, and receive any information and data traversing the system 100. In certain embodiments, the second carrier communications network 175 may include any number of servers, databases, or other componentry. The second carrier communications network 175 may also include and be connected to a cloud-computing network, an IMS network, a VoIP network, a VoLTE network, a wireless network, an Ethernet network, a satellite network, a broadband network, a cellular network, a private network, a cable network, the Internet, an internet protocol network, a MPLS network, a content distribution network, any network, or any combination thereof. In certain embodiments, the second carrier communications network 175 may be part of a single autonomous system that is located in a particular geographic region, or be part of multiple autonomous systems that span several geographic regions.

The second carrier communications network 175 may include a series of components to facilitate communications and the functions of the second carrier communications network 175. In particular, the second carrier communications network 175 may include SBCs 179, which may include any of the functions of a traditional session border controller. For example, SBC 179 may reside at a border of the second carrier communications network 175 and may exert control over signaling associated with communications, such as calls, traversing through the second carrier communications network 175. The second carrier communications network 175 may also include a Tier 2 ENUM 177 that may include any of the functionality of a traditional Tier 2 ENUM. Tier 2 ENUM 177 may utilize DNS records to translate telephone numbers into a URI or IP address that may be utilized in IP-based communications. Moreover, the second carrier communications network 175 may include any number of provider edge devices 181 (e.g. routers) that may be utilized to connect the second carrier communications network 175 to the other networks in the system 100.

Notably, the functionality of the system 100 may be supported and executed by using any combination of the servers 140, 145, and 160. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. In certain embodiments, the servers 140, 145, and 160 may be network servers, routers, gateways, switches, media distribution hubs, signal transfer points, service control points, service switching points, firewalls, routers, edge devices, nodes, computers, mobile devices or any other suitable computing device. In certain embodiments, the servers 140, 145 may be communicatively linked to the first carrier communications network 125, the IPX-P network 165, the second carrier communications network 175, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the first carrier communications network 125, the IPX-P network 165, the second carrier communications network 175, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operation associated with the database 155. In certain embodiments, the database 155 may be connected to the servers 140, 145, 160, the first user device 102, the second user device 111, any devices in the system 100, any other device, any network, or any combination thereof.

The database 155 may also store information and metadata obtained from the system 100, store metadata and other information associated with the first and second users 101, 110, store user profiles associated with the first and second users 101, 110, store device profiles associated with any device in the system 100, store communications traversing the system 100, store user preferences, store information associated with any device or signal in the system 100, store information relating to patterns of usage relating to the first and second user devices 102, 111, store any information obtained from any of the networks in the system 100, store historical data associated with the first and second users 101, 110, store device characteristics, store name server records for any entity in the system 100, store information associated with the private ENUM 133 of the first carrier, store information associated with the Tier 2 ENUM 131 of the first carrier, store information associated with the IPX Tier 1 ENUM 167, store information associated with the Tier 2 ENUM 177 of the second carrier, store information associated with calls made in the system 100, store information associated with ENUM triggers, store pointers to ENUMs, store IP addresses for ENUMs or other components in the system 100, store DNS records for any domain, store call processing information, store any of the information disclosed for any of the operations and functions disclosed for the system 100 herewith, store any information traversing the system 100, or any combination thereof. Furthermore, the database 155 may be configured to process queries sent to it by any device in the system 100.

Operatively, the system 100 may provide a target architecture for enabling IP carrier peering, as shown in the following exemplary scenario. In this scenario and referring to FIGS. 1-3, the first user 101 may transmit, by utilizing the first user device 102, a request to establish a call with second user 110, who is using second user device 111. Also, in this scenario, the IPX Tier 1 ENUM 167 of the IPX-P network 165 may serve as an IPX vendor that will host the name server records of the Tier 2 ENUM 131 of the first carrier, the Tier 2 ENUM 177 of the second carrier, another ENUM, or any combination thereof. Initially, the first user device 102 may initiate a call (e.g. IP-based call) intended for the second user 110. In response to receiving the call from the A-SBC 127, the IMS Core 129 may query the private ENUM 133 of the first carrier for the called number (e.g. E-164 number) of the second user device 111 of the second carrier, as shown in Flow 1 in FIG. 2. The query may include a domain associated with the first carrier, such as "e164.arpa," which may be the domain configured with the ENUM client, e.g. the IMS Core 129. The query may include the called number appended as <reverse telephone number>.1.e164.arpa, and sent to the private ENUM 133 as $ORIGIN 1.1.1.1.2.2.2.2.1.5.1.e164.arpa, for example. If the second user device 111 was a subscriber of the first carrier, the private ENUM 133 would return a match and the IP to IP call may be completed within the first carrier communications network 125. Since, however, the second user device 111 is not a subscriber of the first carrier, the private ENUM 133 may not find the telephone entry associated with the called number, and may return a signal and/or notification indicating that a "Record was not Found" in "e164.arpa."

In response to receiving the signal and/or notification, the IMS Core 129 may forward the call to the BGCF/TF of the IMS Core 129 per 3GPP IMS standards. The BGCF/TF may then modify the query to include an intercarrier ENUM apex domain, such as "e164enum.net." The query is modified to include the intercarrier ENUM apex domain so that the "e164.arpa" domain associated with the first carrier may be bypassed, and go to another DNS hierarchy to find the actual routing record belonging to the second carrier associated with the second user device 111. This may be accomplished by configuring an ENUM trigger that matches on the Session Initiation Protocol Server Trunk Groups coming from the S-CSCFs. The ENUM trigger may specify the alternate ENUM domain (e.g. "e164enum.net"). The BGCF/TF may resend the query to the private ENUM 133 with the modified domain and may receive a DNS name server record configuration directing to the IP address of the IPX Tier 1 ENUM 167. The following provides an example illustration of such a DNS name server record configuring directing to the IP address of the IPX Tier 1 ENUM 167:

Domain
wa1il01isc.wa1il.uvp.itn.att.net IN NS ns1-wa1il01isc.wa1il.uvp.itn.att.net
DNS authority servers
ns1-wa1il01isc.wa1il.uvp.itn.att.net IN AAAA 2001:1890:1001:220B::4
For e164enum.net
e164enum.net IN NS ns.foo.net
Tier 1 ENUM server.
ns.foo.net IN AAAA 2001:1890:1001:220B::4

Based on the DNS name server record configuration received, the BGCF/TF will fetch the IP address of the IPX Tier 1 ENUM 167. Once the IP address of the IPX Tier 1 ENUM 167 is fetched, the BGCF/TF may directly query the IPX Tier 1 ENUM 167 for the hosted name server records of the Tier 2 ENUM 177 of the second carrier using the modified query, as shown in Flow 2. An example query as illustrated in FIG. 2 may be: $ORIGIN 3.8.0.0.6.9.2.3.6.4.1.e164enum.net 3.8.0.0.6.9.2.3.6.4.1 IN NS tier2enum.ims.mnc072.mcc302.3gppnetwork.org.
mnc072.mcc302 may be an IMS 3GPP standard for depicting a specific carrier, e.g. the second carrier in this case. (mnc=mobile network code, mcc=mobile country code) Notably, there is no need for intervention of the private ENUM 133 to forward to the IPX Tier 1 ENUM 167 so that overall call flow may be optimized, which may result in improved and timely call termination. The IPX Tier 1 ENUM 167 may then return the name server records of the Tier 2 ENUM 177 of the second carrier in response to the query, as shown in Flow 3. Then, at Flow 4, the BGCF/TF may query the Tier 2 ENUM 177 of the second carrier, which may find the corresponding entry for the called number. An example query as shown in FIG. 2 is as follows:
$ORIGIN 3.8.0.0.6.9.2.3.6.4.1.e164enum.net
IN NAPTR 10 100 "u" "E2U+sip"
"!.*$!sip:+
14632960083@ims.mnc072.mcc302.3gppnetwork.org;
user=phone!". At Flow 5, the Tier 2 ENUM 177 may return the appropriate NAPTR for the called number, along with a gateway URI corresponding to the device or location where the second carrier wants to accept the call from the first carrier, to the BGCF/TF. At Flow 6, the BGCF/TF may then proceed to forward call processing for the call to the second carrier through the I-SBC 134 to complete the IP call to the second user device 111 of the second carrier. Calls originating from the second carrier may similarly take advantage of the IPX-P network 165 to access the Tier 2 ENUM 131 of the first carrier so as to route calls to the first user device 102.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, receiving a request from a first user device 102 to establish a call with a second user device 111; querying a private ENUM 133 of a first carrier using a domain of a first carrier; determining if a record returned based on the querying includes a called number; performing DNS lookups to resolve domain names; converting the domain of a query to include an intercarrier ENUM apex domain to create a modified query; querying the IPX Tier 1 ENUM 167; querying a Tier 2 ENUM 177 of a second carrier to obtain a record including the called number associated with the call; receiving records; and routing the call to the second user device 111 that is a subscriber of the second carrier; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates a specific example configuration of the various components of the system 100, the system 100 may include any configuration of the components, which may include using a greater or lesser number of the components. For example, the system 100 is illustratively shown as including a first user device 102, a second user device 111, a first carrier communications network 125, an IPX-P network 165, a second carrier communications network 175, a server 140, a server 145, a server 160, and a database 155. However, the system 100 may include multiple first user devices 102, multiple second user devices 111, multiple first communications networks 125, multiple IPX-P networks 165, multiple second carrier communications networks 175, multiple servers 140, multiple servers 145, multiple servers 160, multiple databases 155, or any number of any of the other components inside or outside the system 100. Furthermore, in certain embodiments, substantial portions of the functionality and operations of the system 100 may be performed by other networks and systems that may be connected to system 100.

Figure 4:
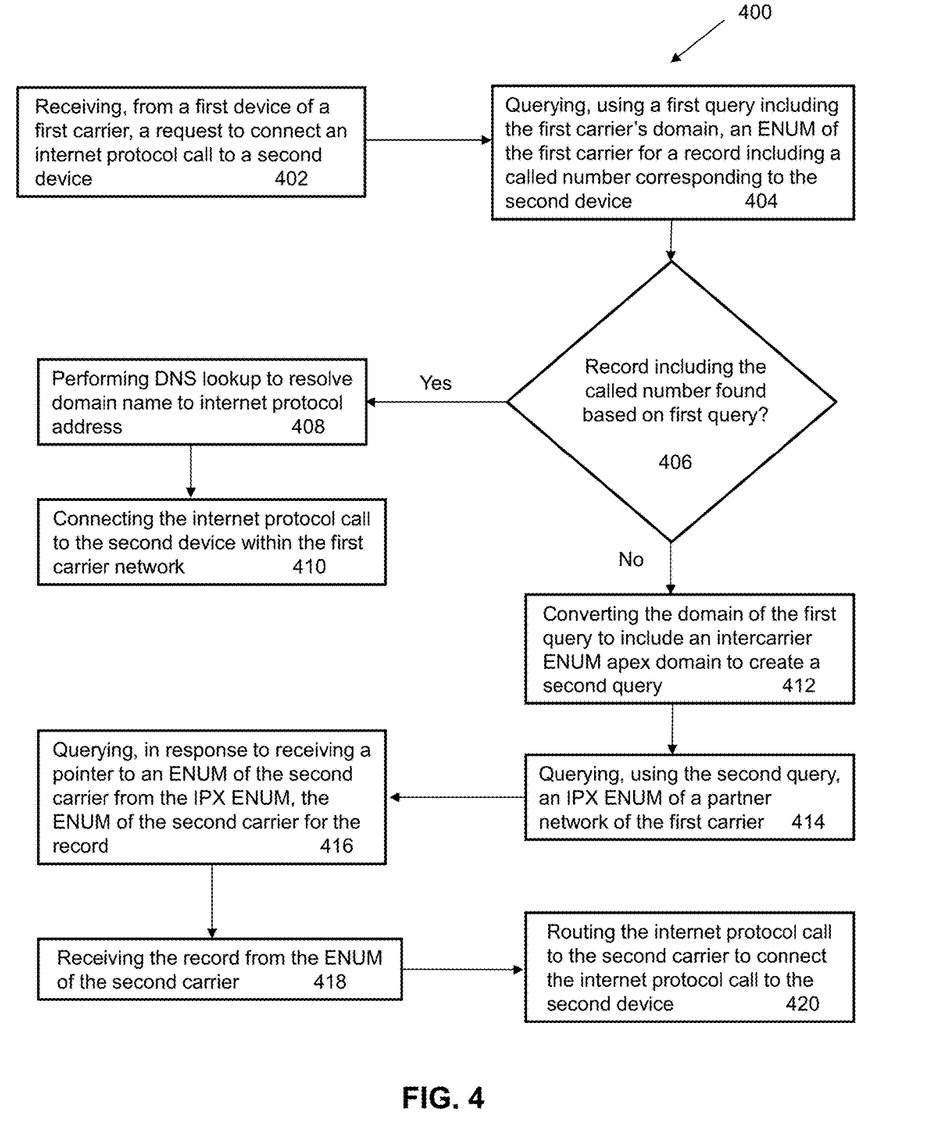
FIG. 4 is a flow diagram illustrating a sample method for providing a target architecture for enabling IP carrier peering according to an embodiment of the present disclosure.

As shown in FIG. 4, an exemplary method 400 for providing a target architecture for enabling IP carrier peering is schematically illustrated. The method 400 include steps for processing an IP based call (e.g. a VoLTE call) from a first subscriber of a first carrier to a second subscriber of a second carrier in accordance with the disclosure provided herein. The method 400 may include, at step 402, receiving, from a first user 101 of the first user device 102 of the first carrier, a request to connect an IP call to a second subscriber (e.g. second user 110) of a second carrier or a second subscriber of the first carrier. The request to connect the IP call may be received by utilizing the IMS Core 129. In certain embodiments, the request to connect the IP call may be received by utilizing the server 140, the server 145, the server 160, the first carrier communications network 125, any combination thereof, or by utilizing any other appropriate program, system, or device. At step 404, the IMS Core 129 may query, using a first query, the private ENUM 133 of the first carrier to retrieve a NAPTR record for a called number (e.g. E-164 number) associated with the second subscriber of the second carrier. The query may include a domain associated with the first carrier, such as "e164.arpa." In certain embodiments, the querying may be performed by utilizing the IMS Core 129, the server 140, the server 145, the server 160, the first carrier communications network 125, any combination thereof, or by utilizing any other appropriate program, system, or device.

At step 406, the method 400 may include determining if a record including the called number was found based on the first query to the private ENUM 133 of the first carrier. In certain embodiments, the determining may be performed by utilizing the private ENUM 133, the server 140, the server 145, the server 160, the first carrier communications network 125, any combination thereof, or by utilizing any other appropriate program, system, or device. If the record is found based on the first query, the second subscriber may be a subscriber of the first carrier. If so, the method 400 may include, at step 408, performing a DNS lookup to resolve the domain name to an IP address within the first carrier network. In certain embodiments, the DNS lookup may be performed by utilizing the server 140, the server 145, the server 160, the first carrier communications network 125, any combination thereof, or by utilizing any other appropriate program, system, or device. Once the domain name is resolved to the IP address, the second subscriber may be connected to the IP call based on the IP address at step 410 of the method 400.

If, however, the record and entry corresponding to the called number are not found at step 406, the method 400 may include, at step 412, having the call request sent to the BGCF/TF of the IMS Core 129, and the BGCF may convert the domain of the first query to include a new domain so as to create a second query. The new domain may be an intercarrier ENUM apex domain, such as "e164enum.net." In certain embodiments, the intercarrier ENUM apex domain may be any domain agreed to between one or more carriers partnering with each other and/or agreed to by one or more standards committees. The BGCF may function as the TF, one of the ENUM clients per 3GPP IMS standards. A query may be resent to the private ENUM 133 of the first carrier using the second query. In response, the BGCF/TF may receive a DNS name server record that enables the BGCF/TF to fetch the IP address of the IPX Tier 1 ENUM 167 of the IPX-P network 165, which may be a partner network of the first carrier and second carrier. The BGCF/TF may then query the IPX Tier 1 ENUM 167 of the IPX-P network 165 using the second query including the intercarrier ENUM apex domain at step 414 of the method 400. In certain embodiments, the querying may be performed by utilizing the BGCF/TF, the server 140, the server 145, the server 160, the first carrier communications network 125, any combination thereof, or by utilizing any other appropriate program, system, or device. In response to querying the IPX Tier 1 ENUM 167 with the second query, the BGCF/TF may receive name server records of the Tier 2 ENUM 177 of the second carrier from the IPX Tier 1 ENUM 167. The BGCF/TF may receive one or more pointers to the Tier 2 ENUM 177 of the second carrier from the IPX Tier 1 ENUM 167.

At step 416, the method 400 may include querying, based on the received name server records and/or pointers, the Tier 2 ENUM 177 of the second carrier. In certain embodiments, the querying may be performed by utilizing the BGCF/TF, the server 140, the server 145, the server 160, the first carrier communications network 125, any combination thereof, or by utilizing any other appropriate program, system, or device. In response to the querying of the Tier 2 ENUM 177, the Tier 2 ENUM 177 may detect an entry corresponding to the called number of the IP call and may return a record (e.g. NAPTR record) to the BGCF/TF at step 418 of the method 400. In certain embodiments, the detection of the entry and return of the record may be performed by utilizing the Tier 2 ENUM 177, the second carrier communications network 175, any combination thereof, or by utilizing any other appropriate program, system, or device. The record may include a gateway URI that identifies where (e.g. a device such as SBC 179) the second carrier is willing to accept calls from the first carrier. Based on the record and/or the gateway URI, the method 400 may include, at step 420, routing the IP call to the second carrier so as to connect the IP call to the device of the second subscriber (e.g. second user device 111). In certain embodiments, the IP call may be routed to the second carrier by utilizing the BGCF/TF, the server 140, the server 145, the server 160, the first carrier communications network 125, the second carrier communications network 175, the SBC 179, any combination thereof, or by utilizing any other appropriate program, system, or device. Notably, the method 400 may further incorporate any of the features and functionality described for the system 100, the method 500 described below, or as otherwise described herein.

Figure 5:
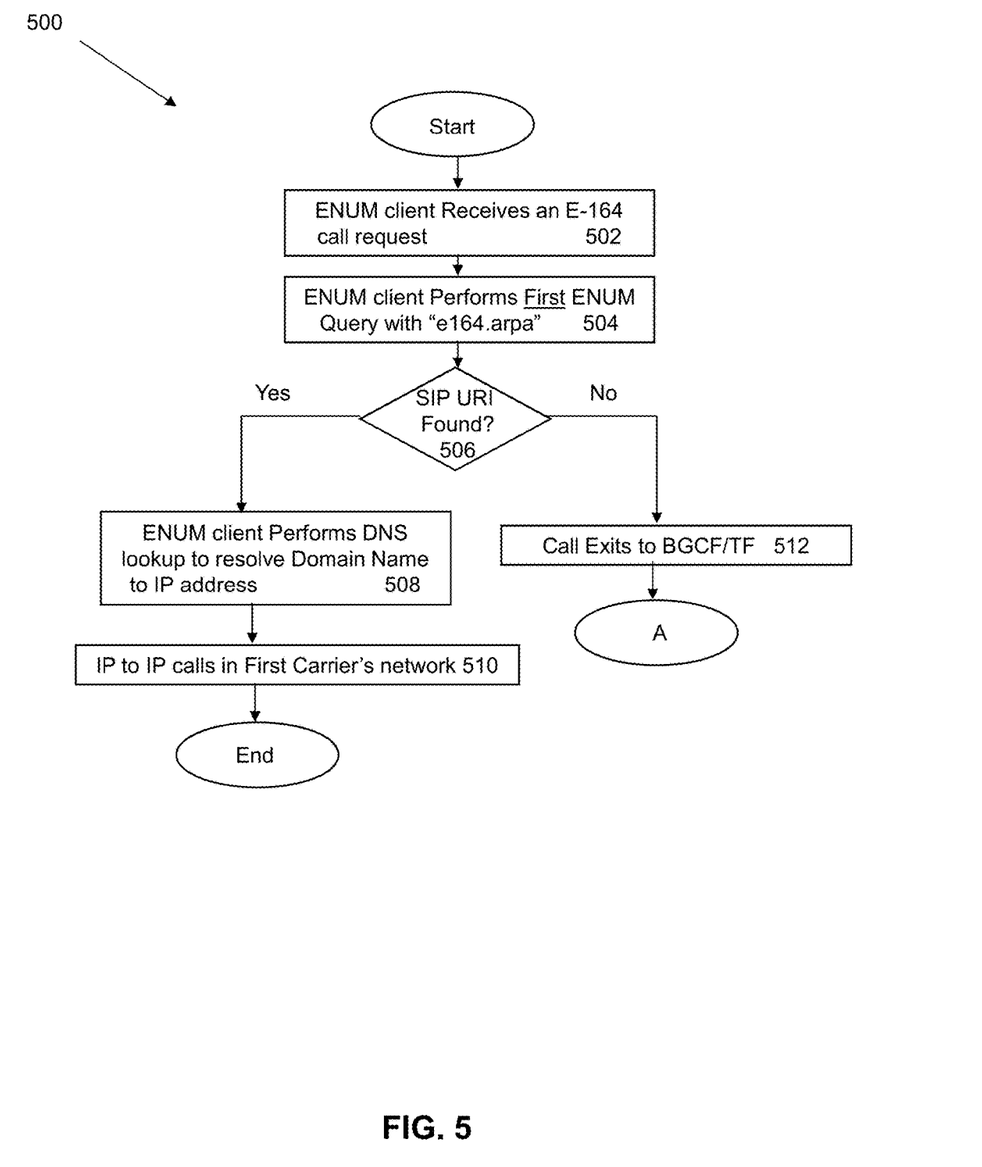
FIG. 5 is a flow diagram illustrating a sample method for processing an IP-based call from a first user of a first carrier to a second user of a second carrier according to an embodiment of the present disclosure.

As shown in FIG. 5, an exemplary method 500 for processing an IP-based call using a target architecture for enabling IP carrier peering is schematically illustrated. The method 500 may illustrate a sequence of steps that may be utilized for processing an IP-based call, such as a VoLTE call, from a first subscriber (e.g. first user 101) of the first carrier to a second subscriber of the first carrier or to a second subscriber of a second carrier (e.g. second user 110). Initially, the method 500 may include, at step 502, receiving, from the first user 101, an IP call intended for either a second subscriber of the first carrier or the second user 110 of the second carrier. The call may be a request to connect the first user 101 to the second subscriber of the first carrier or the second user 110 of the second carrier. In certain embodiments, the call may be received by an ENUM client, such as the first carrier, and the call may include an E-164 request. In certain embodiments, the IP call may be received from and by utilizing the first user device 102, the server 140, the server 145, the server 160, the first carrier communications network 125, any combination thereof, or by utilizing any other appropriate program, system, or device.

At step 504, the method 500 may include having the ENUM client perform a first ENUM query using a domain, such as "e164.arpa", associated with the first carrier. In certain embodiments, the first ENUM query may be performed by utilizing the IMS Core 129, the private ENUM 133 of the first carrier, the first carrier communications network 125, the server 140, the server 145, the server 160, any combination thereof, or by utilizing any other appropriate program, system, or device. At step 506, the method 500 may include determining, based on the first ENUM query, whether a Session Initiation Protocol Uniform Resource Identifier (SIP URI) or other identifier is stored within a memory of the ENUM client. In certain embodiments, the determination may be performed by utilizing the server 140, the server 145, the server 160, the first carrier communications network 125, any combination thereof, or by utilizing any other appropriate program, system, or device.

If a SIP URI is able to be retrieved, then the second subscriber that is intended to receive the IP call from the first user 101 may also be a subscriber of the first carrier. If the second subscriber is a subscriber of the first carrier, the method 500 may include, at step 508, having the ENUM client perform a DNS lookup to resolve a domain name to an IP address. In certain embodiments, the determination may be performed by utilizing the server 140, the server 145, the server 160, the first carrier communications network 125, any combination thereof, or by utilizing any other appropriate program, system, or device. Based on the IP address, the method 500 may then include, at step 510, connecting and completing the call (e.g. IP-to-IP call) to the second subscriber within the first carrier communications network 125. In certain embodiments, the connecting and completion of the call may be performed by utilizing the first user device 102, the server 140, the server 145, the server 160, the first carrier communications network 125, any combination thereof, or by utilizing any other appropriate program, system, or device.

If, however, at step 506, the SIP URI or other identifier cannot be retrieved based on the first query, the ENUM client may be unable to resolve the domain to an appropriate IP address to complete the call. Based on the foregoing, the method 500 may include, at step 512, having the call request exit to the BGCF/TF of the first carrier and following process flow A. The process flow A that occurs once the call request exits to the BGCF/TF is illustrated in FIG. 6.

Figure 6:
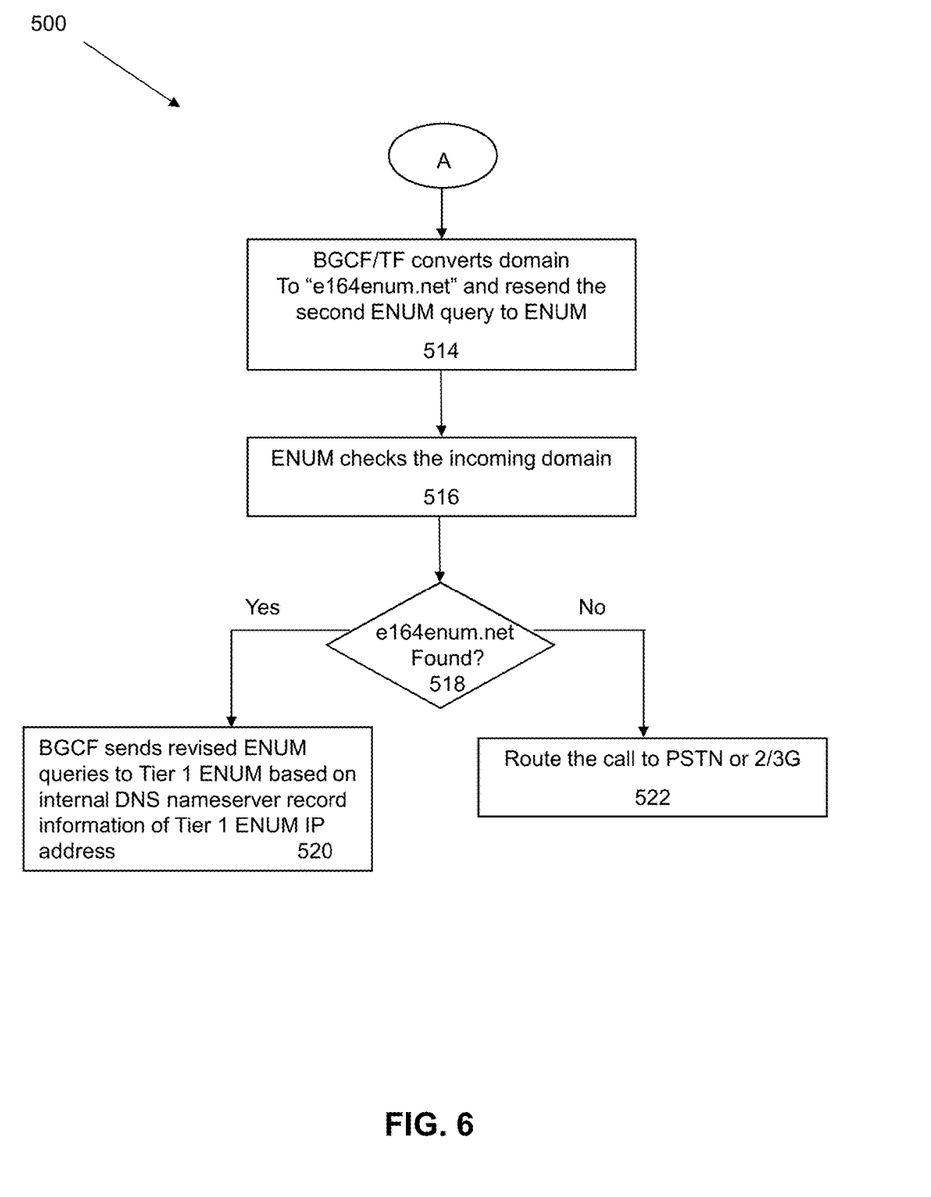
FIG. 6 a flow diagram illustrating further steps in the sample method of FIG. 5 according to an embodiment of the present disclosure

Referring now also to FIG. 6, FIG. 6 illustrates additional steps for the method 500 for processing an IP-based call using a target architecture for enabling IP carrier peering. Once the call request exits to the BGCF/TF of the first carrier, the method 500 may include, at step 514, having the BGCF/TF convert the domain of the query to an intercarrier ENUM apex domain, such as, but not limited to, "e164enum.net." In certain embodiments, the conversion may be performed by utilizing the BGCF/TF, the server 140, the server 145, the server 160, the first carrier communications network 125, any combination thereof, or by utilizing any other appropriate program, system, or device. At step 514, a modified query including the intercarrier ENUM apex domain may be sent to an ENUM, such as the private ENUM 133 of the first carrier. In certain embodiments, the querying may be performed by utilizing the BGCF/TF, the server 140, the server 145, the server 160, the first carrier communications network 125, any combination thereof, or by utilizing any other appropriate program, system, or device.

At step 516, the ENUM may check and examine the new incoming intercarrier ENUM apex domain to determine which carrier the query should be sent to. In certain embodiments, the checking and examining may be performed by utilizing the private ENUM 133, the Tier 2 ENUM 131 of the first carrier, the server 140, the server 145, the server 160, the first carrier communications network 125, any combination thereof, or by utilizing any other appropriate program, system, or device. At step 518, the method 500 may include determining whether the intercarrier ENUM apex domain (e.g. "e164enum.net") has been found based on the querying. If the intercarrier ENUM apex domain has been found based on the querying, the method 500 may include, at step 520, having the BGCF/TF send a revised ENUM query to the IPX Tier 1 ENUM 167 based on internal DNS name server record information that provides an IP address of the IPX Tier 1 ENUM 167. In certain embodiments, the revised ENUM query may be sent by utilizing the BGCF/TF, the server 140, the server 145, the server 160, the first carrier communications network 125, any combination thereof, or by utilizing any other appropriate program, system, or device. Once the query is sent to the IPX Tier 1 ENUM 167, the appropriate carrier for forwarding the call may be identified, and the call may be forwarded accordingly. If, however, the intercarrier ENUM apex domain is not found based on the querying, then the call may not be an IP based call, and the call may be routed to a Public Switched Telephone Network (PSTN), a 2G network, a 3G network, another network, or any combination thereof, for delivery to the second subscriber at step 522 of the method 500. In certain embodiments, the routing may be performed by utilizing the BGCF/TF, the server 140, the server 145, the server 160, the first carrier communications network 125, any combination thereof, or by utilizing any other appropriate program, system, or device. Notably, the method 500 may further incorporate any of the features and functionality described for the system 100, the method 400, or as otherwise described herein.

The systems and methods disclosed herein may include additional functionality and features. For example, in certain embodiments, the functionality and features provided by the systems and methods provide for a dynamic mechanism for providing carrier ENUM-based routing from one carrier to another IP peering partner. Additionally, the systems and methods enhance a carrier's position to offer competitive national and/or global IP services. Also, the systems and methods may assist in eliminating retries and delays, particularly when network disruptions and/or congestions occur. The systems and methods may further provide for optimized service offerings, especially because availability plays an important role in convergent and/or multimedia services. Moreover, the systems and methods improve the efficiency of communication and enhance the flexibility of the IMS to reduce traffic delays and call flows. Notably, the functionality and features provided by the systems and methods take advantage of ENUM technologies being a basic foundation of global VoIP addressing to specific service provider domains and countries.

Figure 7:
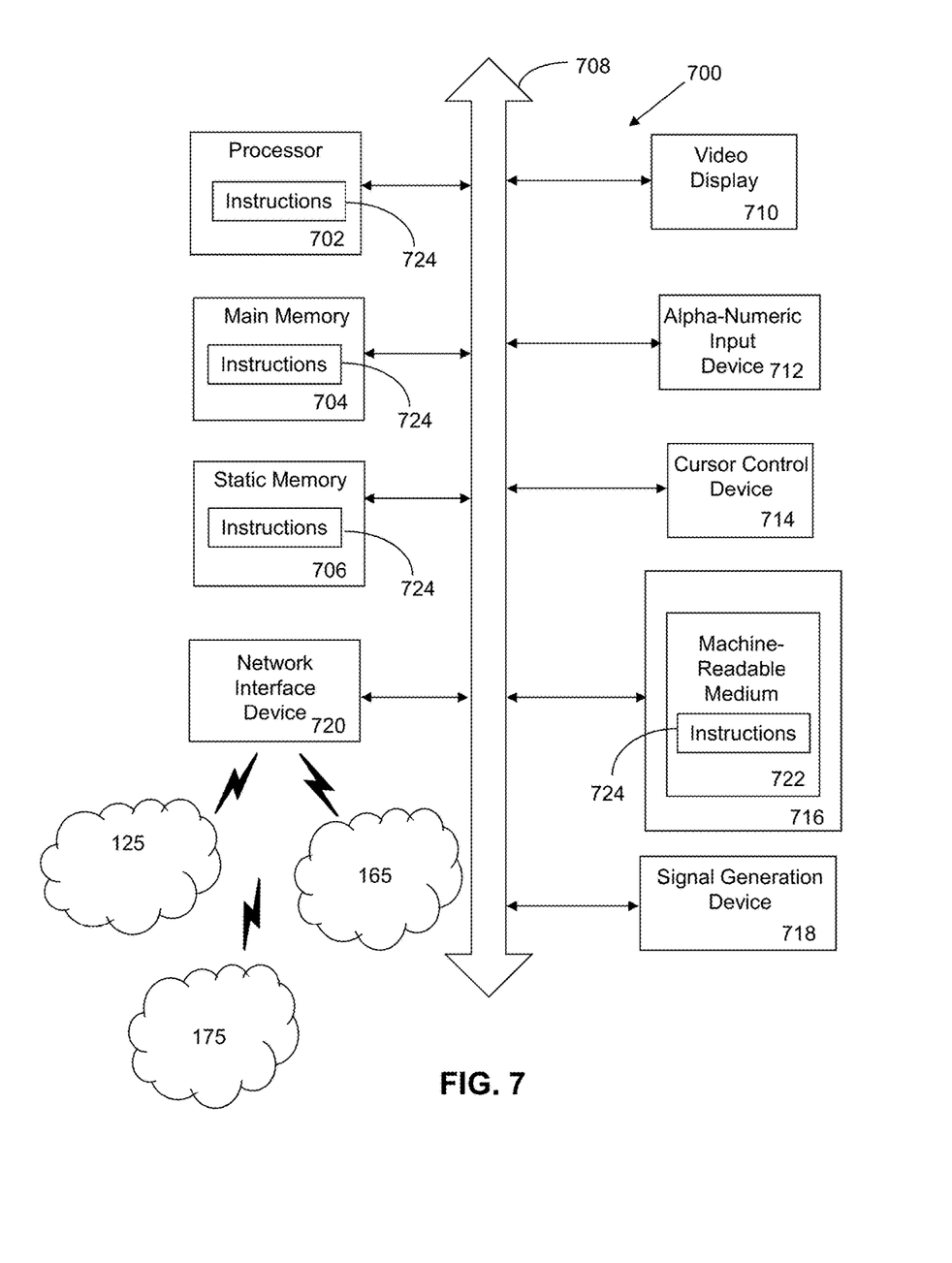
FIG. 7 is a schematic diagram of a machine in the form of a computer system within which a set of instructions, when executed, may cause the machine to perform any one or more of the methodologies or operations of the systems and methods for providing a target architecture for enabling IP carrier peering.

Referring now also to FIG. 7, at least a portion of the methodologies and techniques described with respect to the exemplary embodiments of the system 100 can incorporate a machine, such as, but not limited to, computer system 700, or other computing device within which a set of instructions, when executed, may cause the machine to perform any one or more of the methodologies or functions discussed above.

The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using first carrier communications network 125, IPX-P network 165, second carrier communications network 175, another network, or a combination thereof) to and assist with operations performed by other machines and systems, such as, but not limited to, the first user device 102, the second user device 111, the server 140, the server 145, the database 155, the server 160, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710, which may be, but is not limited to, a liquid crystal display (LCD), a flat panel, a solid state display, or a cathode ray tube (CRT). The computer system 700 may include an input device 712, such as, but not limited to, a keyboard, a cursor control device 714, such as, but not limited to, a mouse, a disk drive unit 716, a signal generation device 718, such as, but not limited to, a speaker or remote control, and a network interface device 720.

The disk drive unit 716 may include a machine-readable medium 722 on which is stored one or more sets of instructions 724, such as, but not limited to, software embodying any one or more of the methodologies or functions described herein, including those methods illustrated above. The instructions 724 may also reside, completely or at least partially, within the main memory 704, the static memory 706, or within the processor 702, or a combination thereof, during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 722 containing instructions 724 so that a device connected to the first carrier communications network 125, IPX-P network 165, second carrier communications network 175, another network, or a combination thereof, can send or receive voice, video or data, and communicate over the first carrier communications network 125, IPX-P network 165, second carrier communications network 175, another network, or a combination thereof, using the instructions. The instructions 724 may further be transmitted or received over the first carrier communications network 125, IPX-P network 165, second carrier communications network 175, another network, or a combination thereof, via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
a memory that stores instructions;
a processor that executes the instructions to perform operations, the operations comprising:
receiving, from a first device of a first carrier, a request to connect an internet protocol call to a second device;
querying, using a first query, a first telephone number mapping of the first carrier for a record including a called number corresponding to the second device;
converting, when the first query does not return the record including the called number, a domain of the first query to include an intercarrier telephone number mapping apex domain so as to create a second query;
querying, using the second query, an internetwork packet exchange telephone number mapping of a partner network of the first carrier and a second carrier;
querying, after receiving a pointer to a second telephone number mapping of the second carrier based on the second query, the second telephone number mapping of the second carrier for the record;
receiving the record from the second telephone number mapping of the second carrier; and
routing, based on the record, the internet protocol call to the second carrier so as to connect the internet protocol call to the second device.

2. The system of claim 1, wherein the operations further comprise querying, by using a third query, the first telephone number mapping to obtain an internet protocol address of the internetwork packet exchange telephone number mapping of the partner network, wherein the third query includes the intercarrier telephone number mapping apex domain.

3. The system of claim 2, wherein the operations further comprise querying, by using the second query, the internetwork packet exchange telephone number mapping of the partner network by utilizing the internet protocol address of the internetwork packet exchange telephone number mapping.

4. The system of claim 1, wherein the operations further comprise determining that the second device is associated with the first carrier when the first query returns the record including the called number.

5. The system of claim 4, wherein the operations further comprise performing a domain name service lookup to determine an internet protocol address associated with the second device.

6. The system of claim 5, wherein the operations further comprise connecting, after determining the internet protocol address associated with the second device, the internet protocol call to the second device within a network of the first carrier.

7. The system of claim 1, wherein the operations further comprise causing the internet protocol call to exit to a breakout gateway control function if the record including the called number corresponding to the second device is not returned using the first query.

8. The system of claim 1, wherein the operations further comprise querying, using the second query, the internetwork packet exchange telephone number mapping of the partner network by utilizing a breakout gateway control function.

9. The system of claim 1, wherein the operations further comprise configuring a telephone number mapping trigger that matches on a session initiation protocol server trunk group.

10. The system of claim 1, wherein the operations further comprise receiving the pointer to the second telephone number mapping of the second carrier in response to the second query.

11. The system of claim 1, wherein the operations further comprise converting the domain of the first query to include the intercarrier telephone number mapping apex domain by utilizing a breakout gateway control function.

12. The system of claim 1, wherein the operations further comprise receiving, in response to querying the second telephone number mapping of the second carrier, a gateway uniform resource identifier for a device that will accept the internet protocol call on behalf of the second carrier.

13. The system of claim 1, wherein the operations further comprise querying the first telephone number mapping of the first carrier for the record including the called number corresponding to the second device using the domain of the first query wherein the domain of the first query corresponds to the first carrier.

14. A method, comprising:
  receiving, from a first device of a first carrier, a request to connect an internet protocol call to a second device;
  querying, using a first query, a first telephone number mapping of the first carrier for a record including a called number corresponding to the second device;
  modifying, when the first query does not return the record including the called number, a domain of the first query to include an intercarrier telephone number mapping apex domain so as to create a second query, wherein the domain is modified by utilizing instructions from a memory that are executed by a processor;
  querying, using the second query, an internetwork packet exchange telephone number mapping of a partner network of the first carrier and a second carrier;
  querying, after receiving a pointer to a second telephone number mapping of the second carrier based on the second query, the second telephone number mapping of the second carrier for the record;
  obtaining the record from the second telephone number mapping of the second carrier; and
  routing, based on the record, the internet protocol call to the second carrier so as to connect the internet protocol call to the second device.

15. The method of claim 14, further comprising querying, using the second query, the internetwork packet exchange telephone number mapping of the partner network by utilizing a breakout gateway control function.

16. The method of claim 14, further comprising querying, by using a third query, the first telephone number mapping to obtain an internet protocol address of the internetwork packet exchange telephone number mapping of the partner network, wherein the third query includes the intercarrier telephone number mapping apex domain.

17. The method of claim 16, further comprising routing the internet protocol call to a public switched telephone network if the intercarrier telephone number mapping apex domain is not found in the first telephone number mapping based on the third query.

18. The method of claim 14, further comprising configuring a telephone number mapping trigger that matches on a session initiation protocol server trunk group.

19. The method of claim 18, further comprising specifying the intercarrier telephone number mapping apex domain based on the telephone number mapping trigger.

20. A computer-readable device comprising instructions, which when executed by a processor, cause the processor to perform operations comprising:
  receiving, from a first device of a first carrier, a request to connect an internet protocol call to a second device;
  querying, using a first query, a first telephone number mapping of the first carrier for a record including a called number corresponding to the second device;
  modifying, when the first query does not return the record including the called number, a domain of the first query to include an intercarrier telephone number mapping apex domain so as to create a second query, wherein the domain is modified by utilizing instructions from a memory that are executed by a processor;
  querying, using the second query, an internetwork packet exchange telephone number mapping of a partner network of the first carrier and a second carrier;
  querying, after receiving a pointer to a second telephone number mapping of the second carrier based on the second query, the second telephone number mapping of the second carrier for the record;
  receiving the record from the second telephone number mapping of the second carrier; and
  forwarding, based on the record, the internet protocol call to the second carrier so as to connect the internet protocol call to the second device.

* * * * *